FLEXIBLE DISC MAGNETIC STORAGE DEVICE

Filed Aug. 12, 1965

INVENTOR
THOMAS A. BOISSEVAIN
BY Robert S. Toperzer 3,369,227
Patented Feb. 13, 1968

3,369,227

FLEXIBLE DISC MAGNETIC STORAGE DEVICE

Thomas A. Boissevain, Bedford, Mass., assignor to Laboratory for Electronics, Inc., Boston, Mass., a corporation of Delaware Filed Aug. 12, 1965, Ser. No. 479,108
8 Claims. (Cl. 340—174.1)

This invention relates to information storage devices and more particularly it is concerned with improvements in flexible magnetic disc type storage devices.

As is well known, a flexible magnetic disc storage device operates upon the principle that the profile of the disc while it is rotating, tends to mirror the contour of an adjacent stationary surface. Accordingly, in a conventional device of this sort the disc is rotated in close proximity to a planar backing plate in which are mounted the heads for reading and writing, and the backing plate, through the medium of the environmental fluid forces that are created by rotation of the disc, has a primary effect upon the profile which the disc assumes. This is not to say, however, that stable operation of the disc with a desirable profile is a simple matter to achieve. The fact is that rather precise control of the fluid flow characteristics must be provided for, and in particular it has been found essential to control the amount of fluid which is allowed to enter in between the disc and the plate as well as the point of entry of the fluid. Conventionally, fluid is admitted through a central region of the backing plate and is caused to flow radially outwardly to exhaust by the pumping action of the disc. Also the rate at which fluid is admitted is usually limited in order to create a partial vacuum on the plate side of the disc.

To control the rate at which fluid is admitted, it has been the practice to provide a manifold beneath the plate, that is on the side of the plate remote from the disc, and to admit air into the manifold by way of a throttling valve. If the drive shaft or spindle on which the disc is mounted depends from above, that is from the side of the disc remote from the plate, this presents no problem. This type of arrangement for example is disclosed in Patent No. 3,110,889 issued to R. E. Morley et al. on November 12, 1963 and assigned to the same assignee as the present invention. However, if the spindle is arranged to extend through the plate from below, which is the generally preferred arrangement, then it is necessary to provide a rotating seal for the spindle so as to avoid the problem of leakage along the spindle and into the manifold. The reason why this latter arrangement is preferred, is that bearing support for the spindle can then be provided as an integral part of the plate, which makes it easier to properly align the spindle with respect to the plate. Also the spindle length from bearing to disc can be quite small which is not the case with the depending spindle arrangement due to the problem of electrical and mechanical interference with the operation of the disc.

The present invention contemplates the avoidance of the need for a separate rotating seal with the preferred spindle arrangement through the use of novel means to control the flow of air or other environmental fluid outwardly of the disc. In accordance with the invention, an annular region of the disc itself is pulled down close to the plate so as to form a partial seal between the region where air is admitted and the remainder of the disc which is used for information storage. This is accomplished in brief by the provision of a ring of holes in the backing plate which communicate between the plate disc interspace and a vacuum pump. The vacuum created by the pump produces a localized deformation of the disc in the vicinity of the holes and it is by means of this deformation or annular depression that the partial seal is formed.

Accordingly, an object of the invention is to provide a flexible magnetic storage device of simplified design.

A more specific object is to provide improved means for control of the fluid force acting on the disc when it is rotating.

The novel features of the invention together with further objects and advantages will become more readily apparent from the following detailed description of a preferred embodiment and the drawing to which the description refers. In the drawing.

Figure 1:
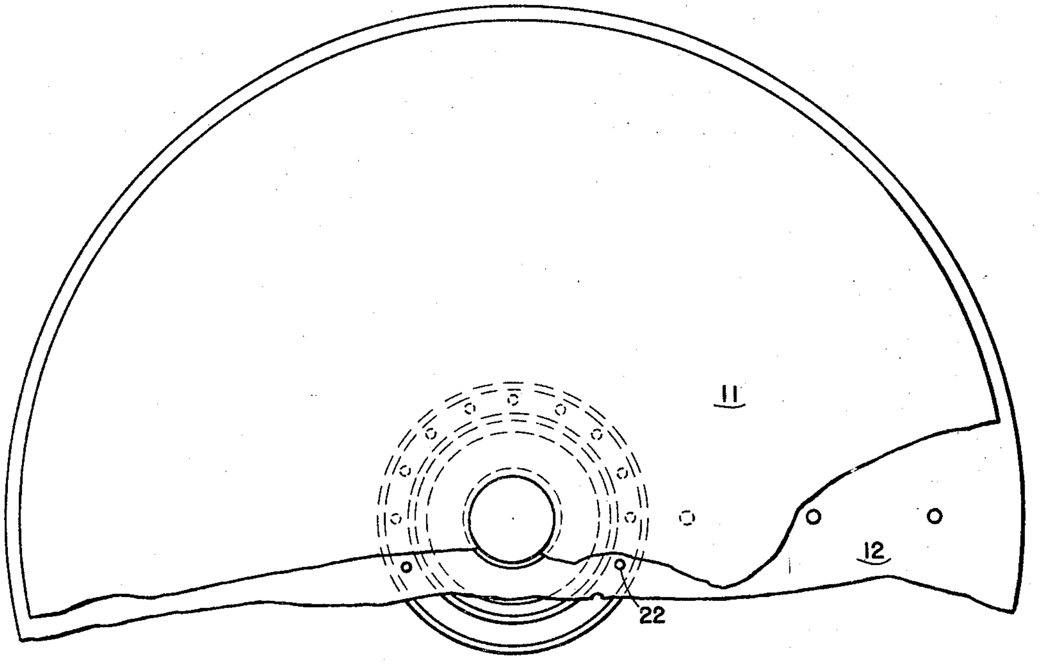
FIG. 1 is a plan view of the device according to the present invention.
Figure 2:
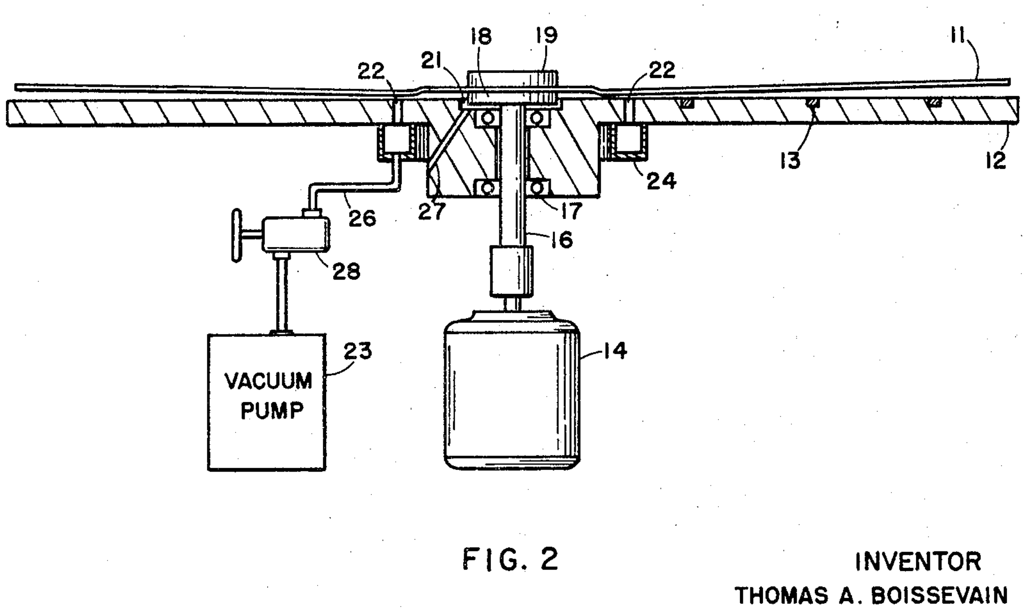
FIG. 2 is a sectional view of the device according to the invention.

With reference now to the drawing, it will be observed that the numeral 11 designates the flexible disc for the storage of information and the numeral 12 designates the backing plate which is adapted to cooperate with the disc for control of its rotating profile. By way of example, the disc may be formed from a thin sheet of plastic which has been coated on at least one of its surfaces with iron oxide. A Mylar sheet having a thickness of .002" has been found to be suitable for this application. The plate, of course, is rigidly mounted so as to present a stationary planar surface closely adjacent to the undersurface of the disc on which the information is stored. Also, the plate serves to retain the heads 13 for transferring the information to and from the disc. As shown, the heads are set into recesses in the plate so that their upper extremities are flush with the plate surface forming, in effect, a single continuous surface together with the plate.

To rotate the disc, there is provided a motor 14. Motor 14 drives a spindle 16 which is mounted in bearings 17 in the plate. The spindle is attached to the disc by means of clamping members 18 and 19. Clamping member 18 is formed as a flange integral with the upper end of the spindle and clamping member 19 is fastened by screws to clamping member 18 with the disc 11 in between. Also, clamping member 18, it will be observed, extends part way into a well 21 which is formed in the center of the plate. By this means, an annular orifice is created between the shoulder on the plate where the well is located and the outer periphery of member 18. Leading from well 21 to the atmosphere is a passage 27 in plate 12.

Finally in accordance with the invention, a ring of holes 22 is provded in the plate. The holes are concentric about the axis of rotation of the disc and are radially spaced a relatively short distance from clamping member 18. Communicating with the holes is a vacuum pump 23 and a manifold 24 of generally annular configuration which underlies the plate. That is to say, manifold 24 seals off from the atmosphere an annular region of the disc surrounding the lower ends of the holes and there is a tubing connection or line 26 extending between the pump and the manifold.

In operation, rotation of the disc causes air or other environmental fluid to be pumped into the space between the disc and the plate by way of the passage 27, and to be pumped out from between this space at the periphery of the disc and the plate. The dynamic fluid forces created by this radial flow of air together with the internal stresses created by centrifugal force established the rotating disc profile.

To control the rate of flow of air in order to produce stable operation with a desirable profile, that is one which results in an appropriate spacing relation between the disc and the heads, vacuum pump 23 is now placed in operation. By means of pump 23, air which is admitted into the central region between the disc and the plate is in part withdrawn through the holes 22 and thence through the manifold 24. As a result, the disc is pulled down close to the backing plate in the vicinity of the holes, the net effect being to produce an annular depression in the disc which acts as a partial seal. This restricts the radially outward flow of air from the central region, where the well 21 is located, to the outer region surrounding the holes 22, where the heads are located. The amount of air withdrawn by the pump and hence the extent of the restriction produced in this way can be precisely controlled by valve 28 in the line from the manifold to the vacuum pump. With this arrangement, there is obviously no need for control of the flow of air before it reaches the well which would entail some kind of rotating seal.

Although the invention has been described in connection with a single preferred embodiment those skilled in the art will recognize that many variants and modifications of this embodiment that are within the spirit and scope of the invention are possible. Therefore, the invention should not be deemed to be limited to the details of what has been described herein by way of illustration, but rather it should be deemed to be limited only by the scope of the appended claims.

What is claimed is:

1. Data storage apparatus comprising a flexible magnetic disc, means to rotate the disc, backing means defining a stationary surface coextensive with one surface of the disc said backing means being apertured to admit fluid in between a central region of the disc and said stationary surface, means to withdraw fluid from between said stationary surface and an annular region of the disc concentric about said central region, said backing means being apertured to admit fluid to said withdrawal means so as to cause a localized annular depression in the disc which restricts the radially outward flow of fluid, and an array of heads mounted in said stationary surface for reading and writing on the region of the disc which surrounds said annular region.

2. Data storage apparatus as claimed in claim 1 wherein said backing means comprises a plate in which is formed a ring of holes to admit fluid to said withdrawal means.

3. Data storage apparatus as claimed in claim 2 wherein said withdrawal means includes a manifold communicating with said holes on the side of the plate opposite from the disc, and a vacuum pump operatively connected to said manifold.

4. Data storage apparatus as claimed in claim 3 wherein said plate includes a central aperture to admit fluid in between said stationary surface defined by the plate and said central region of the disc.

5. Data storage apparatus as claimed in claim 4 wherein said means to rotate includes a shaft extending through said plate and means to clamp the disc to said shaft.

6. Data storage apparatus as claimed in claim 5 wherein said clamping means is formed with a flange on said shaft and a member rigidly fastened to said flange with said disc in between.

7. Data storage apparatus as claimed in claim 6 wherein said flange is recessed in said central aperture in the plate so as to define an annular orifice to admit fluid.

8. Data storage apparatus as claimed in claim 7 including bearing means for said shaft carried in said plate.

References Cited

UNITED STATES PATENTS

| | | | |
|---|---|---|---|
| 3,334,193 | 8/1967 | Dow | 179—100.2 |
| 3,327,916 | 6/1967 | Weidenhammer et al. | 179—100.2 |
| 3,303,485 | 2/1967 | Lee | 179—100.2 |
| 2,950,353 | 8/1960 | Fomenko | 179—100.2 |

TERRELL W. FEARS, *Primary Examiner.*

A. I. NEUSTADT, *Assistant Examiner.*